United States Patent [19]

Maudal

[11] 4,337,427
[45] Jun. 29, 1982

[54] SELECTIVE FILTER FOR CLOSED LOOP SERVO SYSTEM

[75] Inventor: Inge Maudal, Claremont, Calif.

[73] Assignee: General Dynamics, Pomona Division, Pomona, Calif.

[21] Appl. No.: 218,877

[22] Filed: Dec. 22, 1980

Related U.S. Application Data

[63] Continuation-in-part of Ser. No. 140,037, Apr. 14, 1980, abandoned.

[51] Int. Cl.$^3$ .................................................. G05B 5/01
[52] U.S. Cl. .................................... 318/615; 318/629; 318/580
[58] Field of Search ............... 318/615, 616, 617, 618, 318/629, 580

[56] References Cited

U.S. PATENT DOCUMENTS

| | | | |
|---|---|---|---|
| 2,931,901 | 4/1960 | Markusen | 318/629 X |
| 2,944,767 | 7/1960 | Keeler | 318/629 X |
| 2,965,823 | 12/1960 | Wolman | 318/615 |
| 3,077,553 | 5/1963 | Borchard et al. | 318/629 X |
| 3,084,320 | 4/1963 | Hoffman et al. | 318/629 X |
| 3,184,662 | 5/1965 | Wallace | 318/629 X |
| 3,239,733 | 3/1966 | Sikorra | 318/629 |
| 3,246,221 | 4/1966 | Rabier et al. | 318/629 X |
| 3,270,344 | 8/1966 | Righton et al. | 318/615 |
| 3,351,829 | 11/1967 | Qvarnstrom | 318/615 X |
| 3,409,251 | 11/1968 | Lawson et al. | 318/629 X |
| 3,470,430 | 9/1969 | Youkin | 318/629 X |
| 3,519,906 | 7/1970 | Kubler | 318/629 X |
| 3,648,031 | 3/1972 | Neal | 318/616 |
| 3,725,764 | 4/1973 | Oswald | 318/629 |
| 3,808,486 | 4/1974 | Cuda | 318/629 X |
| 4,148,452 | 4/1979 | Niessen et al. | 318/616 X |

*Primary Examiner*—B. Dobeck
*Attorney, Agent, or Firm*—Neil F. Martin; Michael H. Jester; Edward B. Johnson

[57] ABSTRACT

In a closed loop servo system in which the input signal is inaccessible and not available for measurement, but the error signal and output signal are both accessible and measurable, a filter configuration is provided which can be inserted into the error signal path of the system to reduce the undesirable effects of noise or other unwanted signals without appreciably affecting the closed loop dynamics of the overall system. In the generalized system a filter having the characteristics g(s) in LaPlace notation is inserted into the error signal path of the system to filter selected components of the error signal. A second filter having the characteristics h(s) which satisfies the equation $g(s)+h(s)=1$, is coupled between the output signal and the output of the filter having the characteristics g(s). The signal passing through the filter having the characteristic h(s) is summed with the signal leaving the filter having the characteristics g(s) to cancel the filtering effect relative to the output signal and thus to decouple both filters from the control loop. Thus the filtering is accomplished without appreciably altering the characteristics of the control loop. In one application, the invention is utilized in connection with the proportional navigation guidance system for a homing missile. This permits extraneous signal components due to, for example, radome loop coupling and noise to be filtered from the error signal without affective the closed loop dynamics of the missile guidance.

7 Claims, 7 Drawing Figures

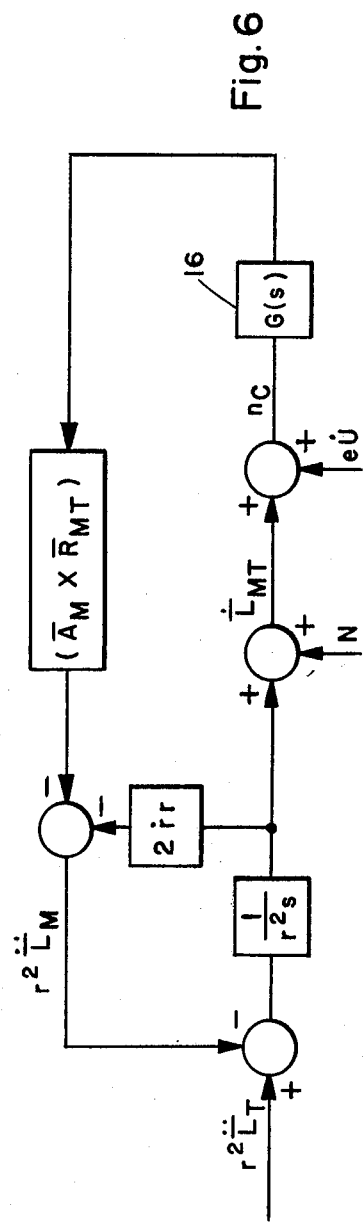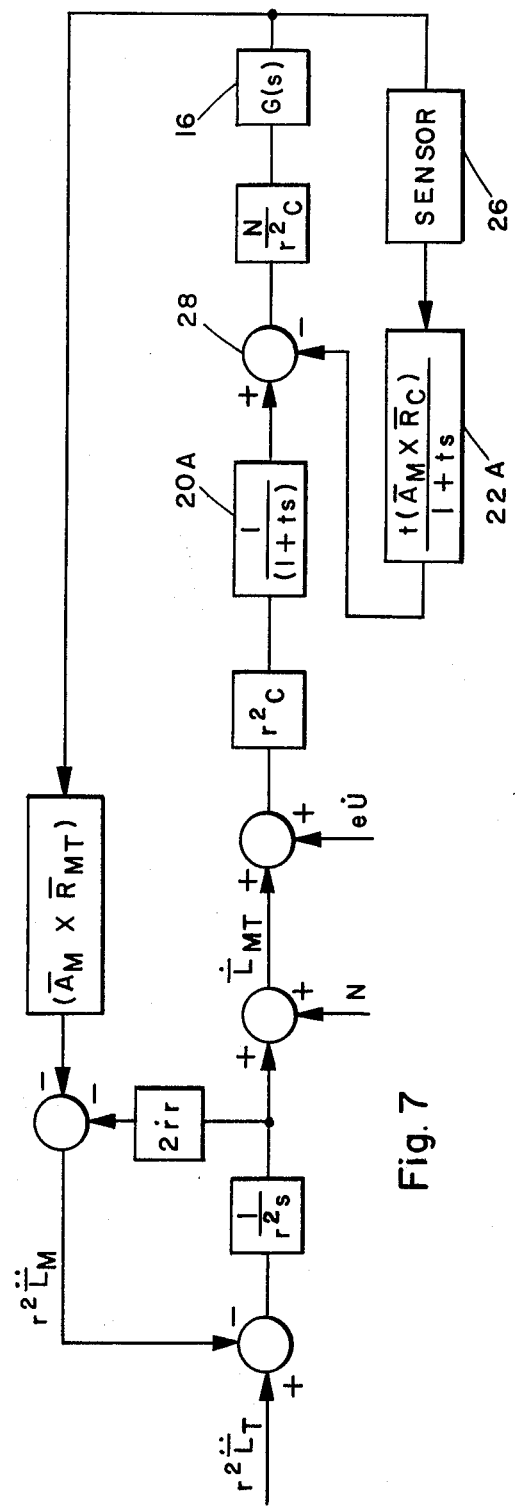

SELECTIVE FILTER FOR CLOSED LOOP SERVO SYSTEM

CROSS-REFERENCE TO RELATED APPLICATION

This application is a continuation-in-part of my U.S. patent application Ser. No. 140,037 filed Apr. 14, 1980 entitled "Selective Filter For Closed Loop Servo System," assigned to General Dynamics, Pomona Division, the assignee of the present application, and now abandoned.

BACKGROUND OF THE INVENTION

This invention relates to the filtering of signals in a closed loop servo system. There are in general no particular problems with filtering in closed loop systems where the input signal is available and hence measurable. But problems arise where only the error signal and the output signal are measurable. This occurs, for example, in a missile guidance loop where the summation of the target maneuver, constituting an input, and the missile response, constituting the output, occurs in the missle-target geometry. There only the error signal and the output signal are measurable. To reduce the undesirable effects of noise and other unwanted signals on the error signal, a filter can be inserted in the error signal path, but such a filter will affect the closed loop dynamics of the overall system. The ability to filter out undesired portions of the error signal is thus limited by the impact on the closed loop system.

Homing missiles developed for military applications have utilized proportional navigation guidance systems. They measure the rate of rotation of the line of sight between the missile and the target and command the missile to maneuver so that the rate of change of the line of sight is driven to zero. Typically in such missiles a space stabilized seeker or detector is mounted on a gimbal assembly beneath a radome. The radome is not ideally transparent in all directions to incoming signals such as RF or infrared signals. Missile wobble can cause the incoming signals to strike different parts of the radome causing incoming signal modulation. This may be erroneously interpreted as target motion and oscillation in the missile guidance loop may result, causing the missile to miss the target. Furthermore, noise attributable to stray incoming signals bouncing off of other objects and to sources in the electronic guidance circuitry can also introduce unwanted components into the error signal of the missile guidance loop. Clearly, missile accuracy can be improved by reducing or eliminating the extraneous signal components in the error signal due to radome loop coupling and noise sensitivity. However, since the measured line of sight rate also "contains" the missile dynamics, it is difficult to filter unwanted components of the error signal without interfering with the overall guidance loop.

Representative of filtered feedback control systems are U.S. Pat. Nos. 2,931,901; 3,184,662; 3,351,829; 3,470,430 and 3,808,486. Also of interest in this general field are U.S. Pat. Nos. 2,944,767; 2,965,823; 3,077,553; 3,084,320; 3,239,733; 3,246,221; 3,270,344; 3,409,251; 3,519,906; and 3,725,764.

SUMMARY OF THE INVENTION

The present invention provides in a closed loop servo system in which the input signal is inaccessible and not available for measurement, but the error signal and output signal are both accessible and measurable, a filter configuration that can be inserted into the error signal path of the system to reduce the undesirable effects of noise or other unwanted signals without appreciably affecting the closed loop dynamics of the overall system. In the generalized system a filter having the characteristics $g(s)$ in LaPlace notation is inserted into the error signal path of the system to filter selected components of the error signal. A second filter having the characteristics $h(s)$ which satisfied the equation $g(s) + h(s) = 1$, is coupled between the output signal and the output of the filter having the characteristics $g(s)$. The signal passing through the filter having the characteristic $h(s)$ is summed with the signal leaving the filter having the characteristics $g(s)$ to cancel the filtering effect relative to the output signal and thus to decouple both filters from the control loop. Thus the filtering is accomplished without appreciably altering the characteristics of the control loop.

In one specific application disclosed herein, the present invention is utilized in connection with the proportional navigation guidance system of a homing missile. This permits extraneous signal components due to, for example, radome loop coupling and noise to be filtered from the error signal without affecting the closed loop dynamics of the missile guidance.

The principal object of the present invention therefore is to provide a novel filter configuration which can be inserted into the error signal path of a closed loop control system without appreciably affecting the closed loop dynamics of the overall system.

BRIEF DESCRIPTION OF THE DRAWINGS

FIGS. 6 and 7 are block diagrams illustrating the application of the present invention to the proportional navigation guidance system of a homing missile.

Throughout the figures like reference numerals refer to like parts unless otherwise indicated.

DESCRIPTION OF THE PREFERRED EMBODIMENT

Figure 1:
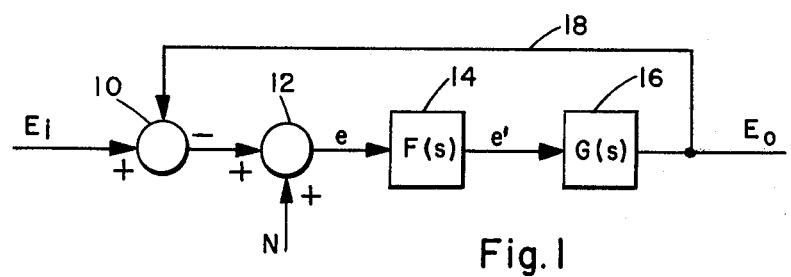
FIG. 1 is a block diagram of a closed loop servo system containing a filter in the error signal path.

FIG. 1 shows a closed loop servo system having an input signal $E_i$ and an output signal $E_o$. Summing unit 10 is a mathematical representation of the subtraction of output signal $E_o$ from input signal $E_i$ to produce an error signal e. Summing unit 10 is not a specific piece of hardware but instead represents the external generation of the error signal e. The present invention is adapted for use in a system where the error signal e and the output signal $E_o$ are accessible and measureable but the input signal $E_i$ is not. For example, the summing unit 10 may represent in a missile guidance loop the summation of the target maneuver, constituting an input, and the missile response, constituting an output occurring in the missile-target geometry.

A noise signal N (FIG. 1) is added to error signal e in a distributed summing junction 12 whose output is applied to a filter 14 having the characteristics F(s) in LaPlace transform notation. The output of filter 14 is applied to the input of control apparatus 16 which can be a motor speed control circuit, a missile guidance system, or any other suitable control apparatus. The dynamic characteristics of control apparatus 16 is G(s) also in LaPlace transform notation. The out signal $E_o$ of control apparatus 16 is fed back to summing unit 10 by a feed back path 18. The characteristic equation of the closed loop system of FIG. 1 is:

$$1 + F(s)\ G(s) \quad\quad \text{Equation 1}$$

From equation 1, it is clear that the ability to filter the undesired signal such as noise N is limited by the impact of the filter on the closed loop system.

The present invention provides a way out of this dilemma by providing a way to decouple the filter from the closed loop system without negating its filtering action. Through selected filtering, i.e., filtering of only selected components of the error signal, the filter may be decoupled from the closed loop. The filter in this case may be entirely determined from the error characteristics of the input only, i.e., the affect on the closed loop characteristics is negated through filter cancellation.

Figure 2:
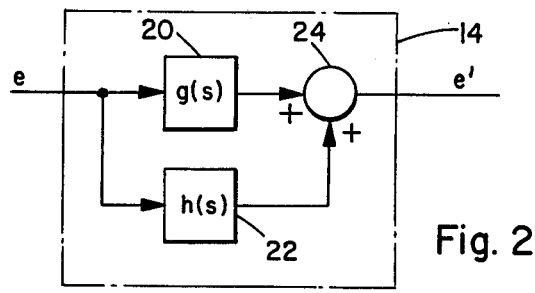
FIG. 2 is a block diagram of two filters connected in parallel and coupled to a summing unit.

Consider initially that filter 14 is made up of two filters 20 and 22 (FIG. 2) which have the characteristics g(s) and h(s) in LaPlace notation, respectively, which are summed at their output by a summing unit 24. Then the filtered output e' is determined from the following equation:

$$e' = [g(s) + h(s)]e \quad\quad \text{Equation 2,}$$

or $$F(s) = g(s) + h(s) \quad\quad \text{Equation 3}$$

Let g(s) be the desired noise filter. Next let h(s) satisfy the equation:

$$g(s) + h(s) = 1 \quad\quad \text{Equation 4}$$

in which case h(s) cancels any effect of the filter g(s). In this case, the cancellation affects the entire error signal and thus effectively removes all filtering action. However, by selectively operating on the components of the error signal e, a selective cancellation can be achieved.

Figure 3:
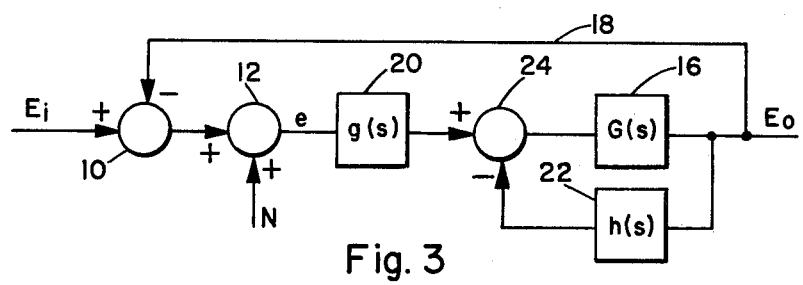
FIG. 3 is a block diagram of a closed loop servo system containing two filters which are connected so as to decouple both filters from the closed loop servo system.

The components of the error signal e are:

$$e = E_i - E_o + N \quad\quad \text{Equation 5}$$

where $E_i$ and $E_o$ are the input and output signals respectively, and N is the noise signal. Selective filtering can be achieved by restricting the cancellation to only one of these components e.g. to $E_o$. FIG. 3 shows a block diagram of a filter arrangement where cancellation is restricted to $E_o$. The transfer function of the circuit in FIG. 3 is:

$$\frac{E_o}{E'_i} = g(s) \frac{G(s)}{1 + [h(s) + g(s)]} \quad\quad \text{Equation \#6}$$

$$\frac{E_o}{E_i} = g(s) \frac{G(s)}{1 + G(s)} \quad\quad \text{Equation \#7}$$

Figure 4:
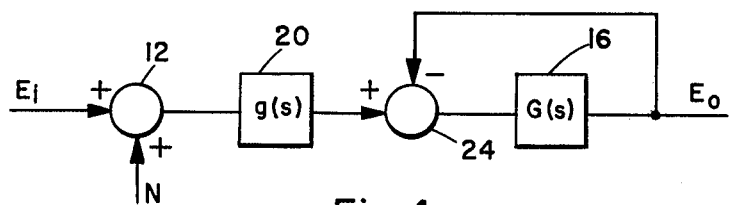
FIG. 4 is a block diagram of the equivalent circuit for the circuit shown in FIG. 3.

An equivalent block diagram representing equation 7 is shown in FIG. 4 and illustrates the removal of the filter from the closed loop dynamics. As an example, consider a simple first order filter where:

$$g(s) = \frac{1}{1 + ts} \quad\quad \text{Equation \#8}$$

then from equation 4, $$h(s) = \frac{ts}{1 + ts} \quad\quad \text{Equation \#9}$$

Figure 5:
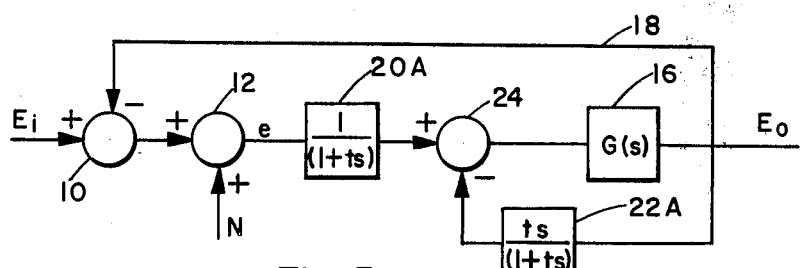
FIG. 5 is a block diagram showing the circuit of FIG. 3 implemented with a simple first order filter.

FIG. 5 shows the implementation in block diagram form. The filters are denoted by reference numerals 20A and 22A. For the system of FIG. 5, $$\frac{E_o}{E_i} = \frac{G(s)}{(1 + ts)[1 + G(s)]} \quad\quad \text{Equation \#10}$$

i.e. the filter is decoupled from the closed loop system.

Note that perfect decoupling is not necessary. Assume the decoupling path of FIG. 5 has the value of (Ts) reflecting measurement uncertainty for example. Then:

$$\frac{E_o}{E_i} = \frac{G(s)}{(1 + ts)\left[1 + \frac{(1 + Ts)}{1 + ts} G(s)\right]} \quad\quad \text{Equation \#11}$$

The imperfect cancellation may introduce some residue in the control loop. However, the influence on the basic characteristic equation is generally negligible.

Note that the cancellation operates only as to the desired output state variable. Thus, all other signal components in the measured error are effectively filtered by g(s). An extraneous signal such as for example radome coupling in the missile is also filtered. This implies that the method of selected filtering is also applicable to attenuate signals induced by radome refraction.

The generalized form of the present invention described above may be specifically adapted to improve the performance of tactical missiles which utilize a proportional navigation guidance system for terminal guidance. This may be implemented by obtaining the missile contribution to the line of sight rate. The information necessary to accomplish this is available from a body mounted accelerometer or inertial reference unit (IRU).

Let the following equations describe the guidance error:

$$\dot{\bar{L}}_{MT} = -\frac{\bar{V}_{MT} \times \bar{R}_{MT}}{r^2} \quad\quad \text{Equation \#12}$$

and, $$\ddot{\bar{L}}_{MT} = -\frac{\bar{A}_{MT} \times \bar{R}_{MT}}{r^2} - 2\frac{\dot{r}}{r} \dot{\bar{L}}_{MT} \quad\quad \text{Equation \#13}$$

where:
a bar (-) denotes a vector;

a dot (·) denotes the first derivatives with respect to time;

two dots (··) denote the second derivative with respect to time;

the notation "x" indicates the cross product of two vectors;

$\overline{L}_{MT}$ is a vector denoting the angle of the line of sight from missile to target;

$\overline{V}_{MT}$ is the missile minus target velocity vector;

$\overline{R}_{MT}$ is the missile-target range vector;

r is the missle-target range scaler; and $\overline{A}_{MT}$ is the missile-target relative acceleration vector.

FIG. 6 illustrates the closed loop guidance error formation in block diagram form. The contribution of the moving target to $\overline{L}_{MT}$ is represented by an input $r^2 \overline{L}_T$ separated from the missile closed loop dynamics. The contribution of the missile to $\overline{L}_{MT}$ is represented by $r^2 \overline{L}_M$ which completes the closed loop system. Only $\overline{L}_{MT}$ can be measured. $\overline{L}_M$ and $\overline{L}_T$ are not available for measurement independently.

In FIG. 6, the effect of radome error is illustrated via the summation of e Ú where e represents the radome refraction and Ú is the rate of change of the missile attitude, i.e., the rate of change of the missile axis with respect to the inertial reference line. $\overline{A}_M$ represents the missile acceleration vector. The summation of $\overline{L}_{MT}$ and e Ú results in a signal $n_C$ which, when applied to the control apparatus 16 of the missile calls for a specified acceleration. The cross product $\overline{A}_M \times \overline{R}_{MT}$ is not performed by a specific piece of hardware but is inherent in the missile target geometry. A noise signal N is added to the error signal in another summing junction.

A solution to the problems of radome loop coupling and noise in the guidance system of FIG. 6 is illustrated in FIG. 7. Since we know that:

$$\frac{d}{dt}[r_c^2 \dot{\overline{L}}_M] = -(\overline{A}_M \times \overline{R}_C),$$ Equation #14 we may use this cross product to represent ts [e$_o$] of block 22A in FIG. 5, as is shown in block 22A in FIG. 7. In equation 14:

$r_c$ is the estimated range scaler (computational);

$\overline{R}_c$ is the estimated range vector (computational);

$\overline{A}_M$ is the missile acceleration vector;

N is a constant (FIG. 7); and $\dot{\overline{L}}_M$ is the missile contribution to the rate of change of the line of sight from missile to target.

The sensor 26 in FIG. 7 represents the IRU or accelerometer of the missile. The filters 20A and 22A in FIG. 7 correspond to the filters having the same reference numerals in FIG. 5. However the LaPlace differential s in the numerator of the representation of the filter 22 A in FIG. 5, is replaced with the differential of $r_c^2 \overline{L}_M$ in the numerator of the representation of the filter 22A in FIG. 7. This latter differential is $-(\overline{A}_M \times \overline{R}_C)$ of equation 14, the negative value being shown by the subtraction at the summing junction 28. The information necessary to accomplish this is available from the sensor 26 which may take the form of an IRU or a body mounted accelerometer. The result is that the missile dynamics are de-coupled from filtering of target motion, noise and radome error effect.

While various embodiments of the present invention have been described, it will be apparent to those skilled in the art that the invention permits of further modification in both arrangement and detail. Therefore the present invention should be limited only in accordance with the scope of the following claims.

I claim:

1. In a closed loop servo system having an inaccessible input signal E$_i$, an accessible output signal E$_o$, an accessible error signal e, control apparatus having an input and an output, the input of said control apparatus being coupled to said error signal e and the output of said control apparatus being said output signal E$_o$, and a first filter having the characteristics g(s) coupled in series with the input to said control apparatus, the improvement comprising:

a second filter having the characteristics h(s) which satisfied the equation: $g(s) + h(s) = 1$, the input of said second filter being coupled to a chosen component of said error signal e; and means for summing the output of said second filter to the output of said first filter.

2. The improvement defined in claim 1 wherein the input of said second filter is coupled to said output signal E$_o$.

3. The improvement defined in claim 1 or 2 wherein:

$$g(s) = \frac{1}{(1 + ts)} \text{ and } h(s) = \frac{ts}{1 + ts}$$

4. A method of decoupling a first filter having the characteristic g(s) from a closed loop servo system, said closed loop servo system having an inaccessible input signal E$_i$, an accessible output E$_o$, an accessible error signal e, control apparatus having an input and an output, the input to said control apparatus being coupled to said error signal e and the output of said control apparatus being said output signal E$_o$, and a first filter having the characteristics g(s) being coupled in series with the input to said control apparatus, said method comprising of:

(a) selecting a second filter having the characteristics h(s) which satisfy the equation $g(s) + h(s) = 1$;

(b) coupling the input of said second filter to a selected component of said error signal; and (c) summing the output of said second filter with the output of said first filter to cancel the filtering action for the selected component of the error signal and thus to decouple both filters from the closed loop system.

5. The method of claim 4 wherein the input of said second filter is coupled to said output signal E$_o$.

6. The method of claim 3 wherein:

$$g(s) = \frac{1}{(1 + ts)} \text{ and } h(s) = \frac{ts}{1 + ts}$$

7. In a missile having a closed loop proportional navigation guidance system for measuring the rate of rotation of the line of sight between the missile and the target and commanding the missile to maneuver so that the rate of change of the line of sight is driven to zero in which $\overline{L}_{MT}$ is applied to a control apparatus G(s) and in which means are available for measuring $\overline{L}_M$, the improvement comprising:

a first filter having the characteristics $1/(1 + ts)$ for filtering $\overline{L}_{MT}$ before it is applied to G(s);

a second filter having the characteristics $$-\frac{t(\overline{A}_M \times \overline{R}_C)}{1 + ts}$$

for filtering $\dot{\overline{L}}_M$; and means for summing the outputs of the first and second filters and applying the sum to G(s), where:

$\dot{\overline{L}}_{MT}$ is the rate of change of the vector denoting the angle of the line of sight between the missile and the target, $\dot{\overline{L}}_M$ is the missile contribution to the rate of change of the vector denoting the angle of the line of sight between the missile and the target, $\overline{A}_M$ is the missile acceleration vector, and $\overline{R}_C$ is the estimated range vector, whereby extraneous signal components due to radome loop coupling and noise will be filtered out without affecting the closed loop dynamics of the missile guidance.

* * * * *